United States Patent
Vogel et al.

(10) Patent No.: US 10,088,569 B2
(45) Date of Patent: Oct. 2, 2018

(54) OPTICAL SYSTEM FOR TRACKING A TARGET

(71) Applicant: Trimble Jena GmbH, Jena (DE)

(72) Inventors: Michael Vogel, Schleifreisen (DE); Thomas Metz, Jena (DE); Torsten Kludas, Zottelstedt (DE); Ute Natura, Jena (DE)

(73) Assignee: Trimble Jena GmbH, Jena (DE)

( * ) Notice: Subject to any disclaimer, the term of this patent is extended or adjusted under 35 U.S.C. 154(b) by 823 days.

(21) Appl. No.: 14/553,983

(22) Filed: Nov. 25, 2014

(65) Prior Publication Data
US 2015/0177382 A1  Jun. 25, 2015

(30) Foreign Application Priority Data
Dec. 23, 2013 (DE) .......................... 10 2013 227 101

(51) Int. Cl.
*G01S 17/66* (2006.01)
*G01S 17/08* (2006.01)
*G01C 15/00* (2006.01)
*G01S 3/786* (2006.01)

(52) U.S. Cl.
CPC ............ *G01S 17/66* (2013.01); *G01C 15/002* (2013.01); *G01S 3/7864* (2013.01); *G01S 17/08* (2013.01)

(58) Field of Classification Search
CPC ........ G01S 17/66; G01S 3/7864; G01S 17/08; G01C 15/002
USPC ...................................................... 250/203.2
See application file for complete search history.

(56) References Cited

U.S. PATENT DOCUMENTS

| | | | | |
|---|---|---|---|---|
| 4,386,848 A | * | 6/1983 | Clendenin | F41G 3/165 244/3.13 |
| 5,483,509 A | * | 1/1996 | Yang | G11B 7/0901 369/110.04 |
| 6,680,788 B1 | * | 1/2004 | Roberson | G02B 26/0875 359/199.2 |

(Continued)

FOREIGN PATENT DOCUMENTS

| | | |
|---|---|---|
| CN | 1688867 A | 10/2005 |
| CN | 101965498 A | 2/2011 |

(Continued)

OTHER PUBLICATIONS

Chinese Office Action dated Aug. 17, 2017, 9 pages.

*Primary Examiner* — Seung C Sohn
(74) *Attorney, Agent, or Firm* — Kilpatrick Townsend & Stockton LLP

(57) ABSTRACT

Optical system for tracking and visually examining a target, comprising an image sensor and a lens arrangement having a variable position relative to the image sensor to project an image of the target onto the image sensor, a light source for emitting light in a predetermined wavelength range in the direction of the target and a filter switch for switching an optical filter for selectively allowing the light in the predetermined wavelength range to pass through to the image sensor into and out of the optical path to optionally perform a visual examination and monitoring of the tracking. A tracking device is provided to perform the tracking of the target using the reflected light in the predetermined wavelength range in a sequence of images held by the image sensor when the first optical filter is switched into the optical path.

19 Claims, 4 Drawing Sheets

(56) References Cited

U.S. PATENT DOCUMENTS

| | | | |
|---|---|---|---|
| 2006/0093269 A1* | 5/2006 | Willis | G02B 6/4226 385/52 |
| 2008/0273191 A1* | 11/2008 | Kim | G01C 3/08 356/4.01 |
| 2012/0014564 A1* | 1/2012 | Jensen | G01C 1/04 382/106 |
| 2012/0105821 A1* | 5/2012 | Moser | G01S 17/66 356/3.09 |
| 2013/0216092 A1* | 8/2013 | Kalevo | H04N 5/232 382/103 |
| 2014/0205141 A1* | 7/2014 | Gao | G06T 7/20 382/103 |
| 2015/0021481 A1* | 1/2015 | Cavallaro | A63B 24/0021 250/340 |
| 2016/0320489 A1* | 11/2016 | Send | G01S 17/003 |

FOREIGN PATENT DOCUMENTS

| | | |
|---|---|---|
| CN | 102317738 A | 1/2012 |
| WO | 2010/092087 A1 | 8/2010 |
| WO | 2013/107781 A1 | 7/2013 |

* cited by examiner

OPTICAL SYSTEM FOR TRACKING A TARGET

CROSS REFERENCE TO RELATED APPLICATIONS

This application claims priority to German Application No. 102013227101.8, filed Dec. 23, 2013, the entire contents of which are incorporated herein by reference in their entirety for all purposes.

FIELD OF THE INVENTION

The present invention relates to an optical system and a method for tracking a target.

TECHNICAL BACKGROUND

Optical instruments such as tachymeters or total stations normally comprise a lens or optical device such as a telescope and an image sensor, as well as actuators to align the optical instrument with a target. When the optical instrument is aligned with the target, angle measurements and distance measurements can be taken to allow the position of the target to be determined.

When aligning the optical instrument with the target, a visual control of the alignment is normally carried out using an eyepiece having crosshairs or using a display on which an image of the target captured by the image sensor and crosshairs can be seen.

Such optical instruments can be used not only to determine the position of a non-moving object; they are also suitable for tracking a moving target. When tracking a moving target the optical instrument is aligned with a target, for example. The optical instrument comprises an image analysis device to identify the target on a sequence of images of the image sensor and also comprises servomotors which allow the optical instrument to always be realigned with the moving target in order to track it.

Areas of application include, for example, road construction, in which the position of a bulldozer, for example, has to be determined and control commands for accurate control can be issued to the bulldozer on the basis of the determined position. Here, it is often the case that a cooperative target is connected to the object, such as a reflector, with which the optical instrument is aligned using a laser for distance measurement. Reflected laser light is detected and used for tracking the target. Moreover, the tracking can also be performed with light in the visible spectral range.

In practical applications, however, it is often a problem that at close range the image of the target moves at a high angular speed on the image sensor, and the servomotors of the optical instrument or the imaging region on the image sensor by adjusting the lens are not sufficient for continuously tracking the target. Furthermore, covering may occur when the target moves closer to objects located near the optical instrument, such as trees, vehicles, walls etc. This problem is made worse by the fact that for accurate angle measurements when tracking the target a lens is often used which covers a narrow angle range, and therefore finding the object by way of a visual control or by an automatic tracking of the object is difficult.

In order to solve this problem, a wide angle lens can be provided parallel to the optical device for tracking, by means of which the target is easier to find and can then be targeted with the tracking lens. This, however, is cumbersome since different lenses have to be provided for different purposes. The parallel offset is disadvantageous in terms of measuring. For accurate measurements, an extremely complex calibration would in this case be necessary.

SUMMARY OF THE INVENTION

It is therefore an object of the present invention to provide an optical system and a method by way of which a suitable tracking of a target both at close range and at long range is made possible, while at the same time the possibility of optical monitoring is also facilitated.

This object of the invention is achieved by the subject matter of the independent claims. Advantageous embodiments can be found in the dependent claims.

DETAILED DESCRIPTION OF THE PREFERRED EMBODIMENTS

Figure 1:
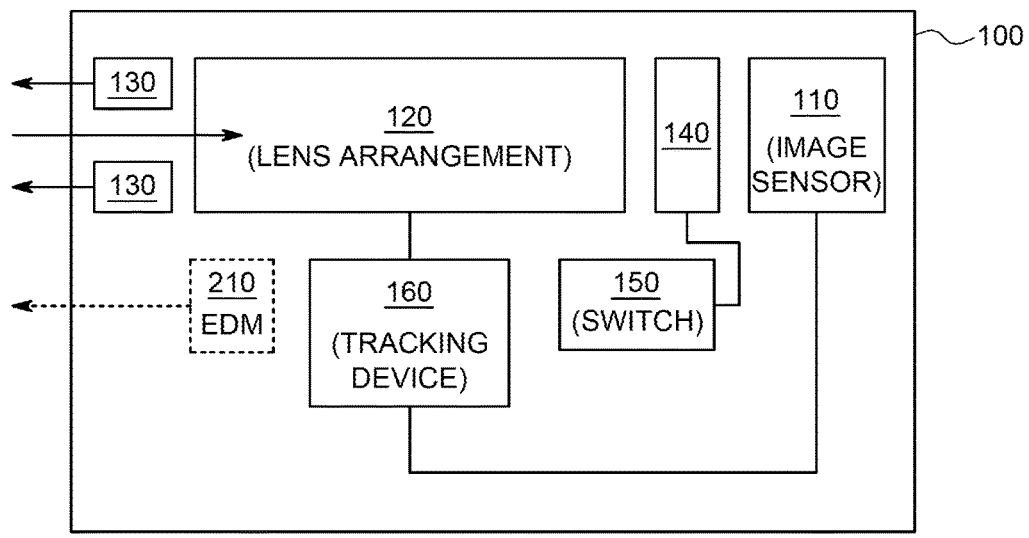
FIG. 1 schematically shows an arrangement of an optical system for tracking a target according to an embodiment example of the present invention.

According to one embodiment example, an optical system for visually imaging and/or tracking a target comprises an image sensor and a lens arrangement having a variable position relative to the image sensor along an optical path of the optical system to project an image of the target onto the image sensor, a light source for emitting light in a predetermined wavelength range in the direction of the target, a first optical filter for selectively allowing the light in the predetermined wavelength range to pass through in the direction of the image sensor, a filter switch for switching the first optical filter into and out of the optical path and a tracking device for tracking the target using the reflected light in the predetermined wavelength range in a sequence of images of the target obtained by the image sensor when the first optical filter is switched into the optical path.

Thus, an optical instrument can be equipped with a lens to visually monitor a target in the visible spectral range and track it using light in a certain wavelength range since the filter can be switched into the optical path. Moreover, the tracking of the target can be performed by virtue of the lens arrangement having a variable position relative to the image sensor with different settings and therefore image angular ranges, so that in particular at close range the target is not lost, i.e. the image of the target moves out of the range detected by the image sensor or is no longer on the image sensor after being covered by other objects.

Since one lens is provided for tracking both at close range and at long range, and not different lenses for tracking at close range and at long range, a parallel offset between the two lenses and the disadvantages associated therewith can be avoided.

The tracking device can be adapted to perform the tracking of the target by determining the position of the image of the target on the image sensor and aligning the optical path of the optical system such that the position of the image of the target comes to rest in and is held in a predetermined tracking position and the tracking device is adapted to also perform the tracking of the target if the alignment of the optical path for holding the image of the target in the tracking position is not possible owing to the movement of the target, by tracking the changing position of the image of the target on the image sensor.

Furthermore, a laser device can be provided to emit laser light along the optical path in the direction of the target, the tracking position being specified as the position of the laser light reflected by the target on the image sensor, which is emitted for measuring the distance from the optical system. The laser light can be detected by the image sensor using an optical band-pass filter.

A motor unit can move the lens arrangement relative to the image sensor into a lens position in a wide angle setting and into a lens position in a narrow angle setting and can put the lens arrangement in the wide angle setting when, for example, an alignment of the optical path for holding the image of the target in the tracking position is not possible owing to the movement of the target and can put the lens arrangement in the narrow angle setting when an alignment of the optical path for holding the image of the target in the tracking position is possible.

During the tracking of the target, the motor unit can move the lens arrangement from the position in the wide angle setting into the position in the narrow angle setting and in doing so perform the movement of the lens arrangement from the lens position in the wide angle range into the lens position in the narrow angle range via a predetermined number of lens positions corresponding to intermediate angle ranges.

The predetermined number of intermediate angle ranges can be selected such that the depth of field ranges of the lens arrangement overlap corresponding lens positions in adjacent intermediate angle ranges.

Moreover, the lens position of the lens arrangement in the wide angle range, in the intermediate angle ranges and in the narrow angle range can be selected such that the size of the image of the target on the image sensor is maintained. For lens positions of the lens arrangement in the wide angle range, in the intermediate angle ranges and in the narrow angle range, calibration values can be used for a vertical collimation error and a lateral collimation error to correct measured angle values when tracking the target. The calibration values can be determined at the respective lens positions by measuring an object in the two telescope positions, i.e. the two optical positions of the lens arrangement.

Furthermore, the motor unit can approach the respective lens positions of the lens arrangement in the wide angle range, in the intermediate angle ranges and in the narrow angle range from the same direction in order to minimize positioning errors.

According to a further embodiment, the light source is provided by an electronic distance meter EDM emitting a laser light and/or by a plurality of light-emitting diodes arranged around the lens arrangement. The plurality of light-emitting diodes can include a first group of light-emitting diodes having narrow beam divergence characteristics and a second group of light-emitting diodes having wide beam divergence characteristics. The plurality of light-emitting diodes or the electronic distance meter can be pulsed in synchronization with an exposure time of the image sensor. The emitted light is reflected by the target, which may be an active or cooperative target or a passive target, and hits the image sensor.

According to a further embodiment, the optical system comprises a second optical filter for selectively blocking the light in the predetermined wavelength range and the filter switch is adapted to switch the second optical filter into the optical path in order to take a visual image of the target with the image sensor. The filter switch can be provided by a filter wheel holding the first and second optical filters and the switching of the first and second optical filters into and out of the optical path can be effected by rotating the filter wheel. By continuously rotating the filter wheel to alternate between tracking the target and taking the visual image in time with the switching of the filters, visual monitoring of the target during the tracking of the object can be facilitated.

According to a further embodiment, the optical system comprises a monitor diode which sends the light along the optical path as monitor light in the direction of the image sensor. Alternatively, a reflector and a beam splitter can be provided, which directs a part of the laser light for distance measurement along the optical path as monitor light in the direction of the image sensor. A correction unit can detect a displacement of the position of the monitor light on the image sensor owing to a lateral movement of the lenses of the lens arrangement and correct the tracking position using the displacement.

The optical system may be a total station.

In the following, a schematic arrangement of an optical system for tracking a target according to an embodiment example of the present invention will be described with reference to FIG. 1.

The optical system comprises an image sensor 110 and a lens arrangement 120 having a variable position relative to the image sensor along an optical path of the optical system 100 to project an image of a target onto the image sensor 110. The target may be any object, including a reflector affixed to an object to be monitored.

A light source 130 is provided for emitting light in a predetermined wavelength range in the direction of the target. The light in the predetermined wavelength range is reflected by the target in the direction of the optical system and enters the lens arrangement 120. A first optical filter 140 is provided, and it selectively allows the light in the predetermined wavelength range to pass through in the direction of the image sensor 110. A filter switch 150 is provided to move, i.e. to switch, the first optical filter into and out of the optical path.

With the optical system in FIG. 1, it is possible to track a target using a single lens or lens arrangement and image sensor by switching the first optical filter into and out of the optical path by means of light in the predetermined wavelength range and in doing so to also perform visual monitoring of a region or surroundings with the target. When the first optical filter is switched into the optical path, only the light in the predetermined wavelength range emitted by the light source in the direction of the target and reflected by said target is guided through the optical arrangement and the filter to the image sensor. Thus, it is only light in the predetermined wavelength range that is on the image sensor, which facilitates simplified tracking of the target. When the first optical filter is switched out of the optical path, particularly light in the visible spectral range, for example, of the target and the surroundings also passes through the optical arrangement and hits the image sensor, by which visual monitoring of the region with the target is possible. In addition, the light source can be switched off in the phases in which the filter is switched out.

Preferably, a cooperative target can be used, such as a reflector for light in the predetermined wavelength range, which additionally supports the tracking. Furthermore, an active target can be used which emits light in the predetermined wavelength range. The light in the predetermined wavelength range may be light in the infrared or the near infrared range. For example, the target may comprise a light source which emits light in the infrared or near infrared range. However, light in other wavelength ranges may also be used for tracking.

The optical system may be, for example, a video tachymeter or total station, by means of which an object or target can be targeted, by an optical path defined by a lens arrangement such as the lens arrangement 120 being aligned with the target. If the optical system has been aligned with the target, corresponding angle measurements can be taken for determining the position of the object, for example by determining a vertical and a horizontal angle.

In one example, the optical system is part of such a tachymeter or total station mounted on a tripod which can be set up on the ground. After being set up on the ground and the position of the set-up has been determined, targets on the ground can be targeted by aligning the optical path and position determining can be performed as known.

The image sensor 110 is preferably an arrangement of light-sensitive elements, for example in a two-dimensional matrix. The image sensor may be a CCD or CMOS sensor or any other available image sensor.

The lens arrangement may in general be any optical arrangement to project an image of the surroundings of the optical system onto the image sensor or depict it on said image sensor. In addition, the lens arrangement preferably has a number of fixed and movable lenses, including, for example, a movable lens for setting a field of view or aperture angle, and a movable lens for setting a focus, as well as one or more fixed lenses. The lenses may also be provided by lens groups. The lens arrangement may in general be accommodated in a telescope which forms part of the optical system. Thus, the lens position of the lens arrangement can be defined by a position of one or more movable lenses relative to the image sensor or the other lenses.

An eyepiece may be provided in order to facilitate a direct optical or visual examination of the surroundings of the optical system. However, it is also conceivable that an image taken by the image sensor of the surroundings of the optical system is taken and displayed only on a display.

Preferably, the lens arrangement is provided with variable focal length so that it is not only optical targets at close range that can be tracked, for example with a wide angle setting of the lens arrangement, but also objects located further away, with a narrow angle setting of the lens arrangement. The wide angle setting facilitates the imaging of a larger surrounding region on the image sensor, while the narrow angle setting facilitates improved accuracy, for example at long range. The invention therefore advantageously facilitates the monitoring and tracking of a target at close range and also at long range with an additional option of visually monitoring the target with a single optical arrangement.

The light source 130 for emitting light in a predetermined wavelength range can be any light source for emitting light in the predetermined wavelength range. For example, the light in the predetermined wavelength range may be light in the infrared or near infrared range, i.e. infrared light. Moreover, the light in the predetermined wavelength range may be light in any other wavelength range, including light in the visible spectral range, such as light in a wavelength range which facilitates tracking depending on the ambient conditions, such as solar radiation. The light source preferably emits the light in the predetermined wavelength range along the optical path in the direction of the target, so that light in the predetermined wavelength range reflected by the target passes in the direction of the optical system through the lens arrangement and hits the image sensor, by which an image of the target is depicted on the image sensor.

The first optical filter 140 for selectively allowing the light in the predetermined wavelength range to pass through in the direction of the image sensor may be any optical filter which blocks corresponding other light components but not the light in the predetermined wavelength range. The first optical filter may in principle be switched into the optical path at any point, i.e. before or after the image sensor or also in the lens arrangement. In FIG. 1 it is shown by way of example that the first optical filter can be switched between the lens arrangement and the image sensor. The filter switch 150 for switching the first optical filter into and out of the optical path is preferably mechanically coupled to the first optical filter, so that when the switch is activated the first optical filter is swiveled or moved into the optical path. The switch 150 may also comprise a motor unit to set the optical filter into a lateral motion or rotational motion, in order to switch the first optical filter in this way into and then out of the optical path for filtering the light in the predetermined wavelength range reflected by the target. The switch 150 may also be mechanically switchable, for example by a user activating a mechanical switch, for example on the housing of the optical system, or it may be a switch controlled by a software procedure to move the first optical filter accordingly by means of a motor control.

The tracking device 160 may be any device allowing the position of the target to be tracked. The tracking may be the alignment of the optical system or of the optical path with the target, and the appropriate adjustment of the alignment of the optical path to follow a moving target. Furthermore, the tracking may be the detection of the image processing of the image of the target on the image sensor and/or the tracking of a changing position of the image of the target on the image sensor.

Thus, when tracking, the optical system or the optical path defined by the lens arrangement can, as far as possible, be aligned with the target and can track it. However, if the target has too high a movement speed or angular speed, such that the possibilities for mechanically adjusting the optical system are not sufficient for repositioning the optical path to the moving target, then the position of the image of the target on the image sensor can additionally or alternatively be tracked, for example, for certain sections of the tracking, to fully realign the optical path with the target when the speed of the target has reduced again.

Moreover, the tracking device 160 can be adapted to perform the tracking of the target by determining the position of the image of the target on the image sensor and repeatedly aligning the optical path of the optical system 100 such that the position of the image of the target on the image sensor 110 comes to rest in and is held in a predetermined tracking position. This means that the image of the target is detected on the image sensor, for example by means of increased detection values of certain pixels of the image sensor or other image features of the target. The optical path of the optical system is then adjusted, using motors for example, such that the optical path continues to be aligned with the target even when the object moves, so that the image of the target comes to rest again at the original position, i.e. the tracking position. The tracking position on the image sensor may be any position, preferably a position or a pixel or a group of pixels in the region of the center of the image sensor.

Moreover, to perform the tracking the tracking device is preferably adapted to additionally or alternatively perform the tracking of the target by tracking the changing position of the image of the target on the image sensor if, owing to the movement of the image, an alignment of the optical path for holding the image of the target in the tracking position is not possible. In other words, in the case of too high a speed of the target relative to the optical system, tracking by means of aligning the optical path potentially may not be sufficient to always hold the target in the tracking position on the image sensor, and therefore instead of or in addition to aligning the optical path the image of the target on the image sensor can also be detected and the changing position thereof can be tracked. If the relative speed of the target is subsequently lower again, the optical path can be realigned with the target such that the image of the target comes to rest in and is held in the tracking position on the image sensor. This can also be carried out in the event of a temporary covering of the target, if a target is temporarily not visible on the sensor; when the image of the target can be seen again on the sensor, the image can be tracked in one or both of the ways described.

In one embodiment example, the tracking device comprises mechanical components to move the optical system accordingly into a desired alignment of the optical path, for example to align the optical system with a target, and software or hardware or combination components to facilitate corresponding image processing for tracking the image of the target on the image sensor and aligning the optical system. The optical system preferably comprises a memory, a processing unit and sensors or actuators or motors suitable for performing corresponding processing and controls.

Figure 2:
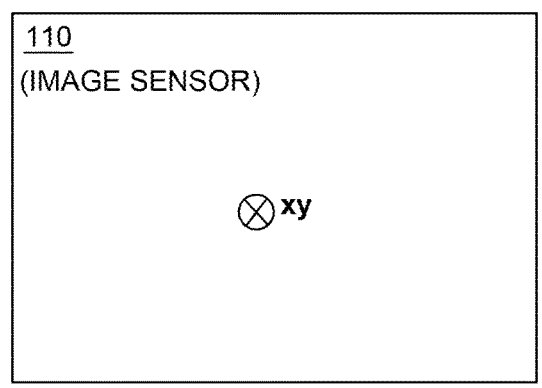
FIG. 2 shows an image sensor according to an embodiment example of the present invention.

In the following, a further embodiment example of the present invention will be described with reference to FIG. 2. FIG. 2 shows an example of an image of the target taken by the image sensor 110.

In FIG. 2, the image of the target is schematically shown in the central region of the image sensor at the image sensor position XY, for example in a matrix of image pixels in the direction of X and Y. In FIG. 2 it is assumed that the image of the target comes to rest at precisely the tracking position XY of the image sensor. The tracking position is found by arranging the lens arrangement and the image sensor relative to one another; preferably, the tracking position can be a central position of the image sensor. The tracking position is the position determined by the lens arrangement and the alignment thereof with the image sensor, in which a target lying in the optical path, for example on an optical axis of the lens arrangement, is precisely shown on the image sensor.

In practical cases, however, this criterion is difficult to comply with on a permanent basis, i.e. in a real system with errors and mechanical play the tracking position will not come to rest in precisely the predefined region of the image sensor, or depending on temperatures, use etc. there may be slight changes to the operation of the optical system. This means that the tracking position on the image sensor is not the same position for all instances but rather a position which can change depending on the conditions in a certain region. It is therefore desirable to precisely specify the tracking position in each case also during operation, for which the optical system can be equipped with a laser device 210 in FIG. 1 for emitting laser light along the optical path. The tracking position can then be defined as the position of the reflected laser light on the image sensor 110.

For example, a laser device of an optical system provided for an electronic distance meter may be used as the laser device 210. Since such a distance meter emits laser light in the direction of the target and calculates the distance to the target based on the reflection of the laser light by the target, and the laser light passing through the lens arrangement also hits the image sensor after it has been reflected by the target, the laser light can also be used to specify the tracking position. Preferably, the laser device 210 is arranged such that it couples the emitted laser light into the optical path of the lens arrangement for example by means of a beam splitter, so that the laser light is emitted along the optical path and is reflected or scattered by the target in the direction of the image sensor. Depending on the positions of the lens arrangement and the image sensor with respect to one another, the laser light emitted for distance measurement will hit the image sensor at a defined point, i.e. the tracking position. In this way, the tracking position can be specified at the beginning of an operation or also during operation at certain intervals in order to minimize errors. In FIG. 1, the laser arrangement 210 is shown schematically to emit light parallel to the lens arrangement, but this is only one example. As mentioned above, it is possible to also couple the laser light into the optical path of the lens arrangement by means of a beam splitter, so that the laser light is guided into the region of the central region of the lens arrangement.

In order to facilitate or improve the detection on the image sensor of the laser light reflected by the target, a band-pass filter can be switched into the optical path for this purpose, so that only light in the range of the laser light can pass through the lens arrangement and hit the image sensor. The determination of the tracking position is thereby facilitated since only the laser light is visible on the image sensor.

Since during operation of the optical system, for example in a tachymeter or a total station with an electronic distance meter, the laser light emitted for distance measurement specifies an optical axis of the lens arrangement, namely the direction in which the distance measurement and therefore also the determination of the position is possible, the laser light can in this way preferably be used for determining the tracking position. The tracking position may be indicated as crosshairs on a display device, preferably as the point of intersection of the crosshairs.

Figure 3:
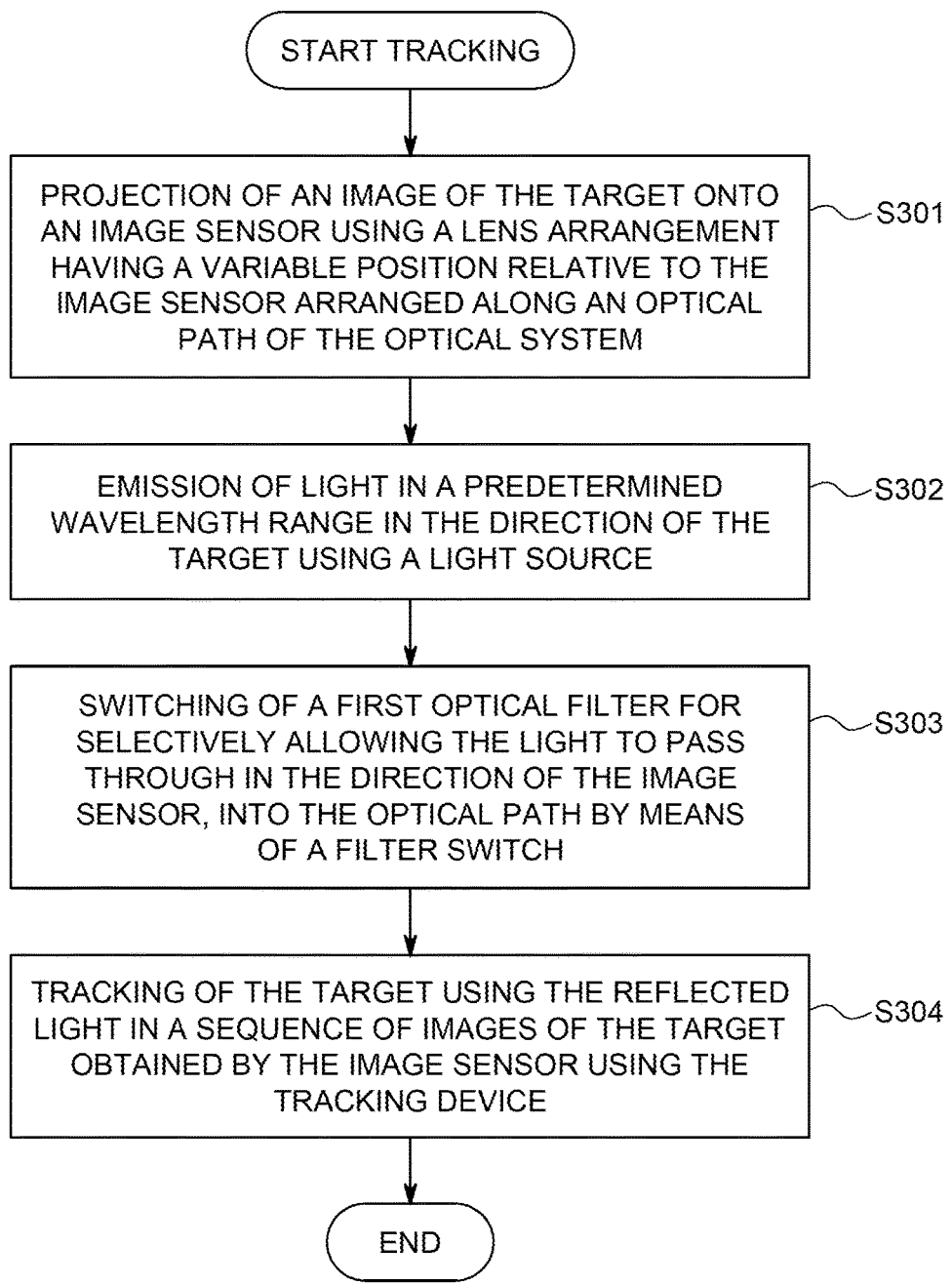
FIG. 3 shows a method for tracking a target according to an embodiment example of the present invention.

FIG. 3 shows an embodiment example of a method for tracking a target with the optical system, for example the optical system from FIG. 1 and FIG. 2.

After the optical system has been positioned in a construction zone, for example, the tracking of a target, for example a bulldozer in highway construction, can be begun. First of all, in step S301, an image of the target, for example on the bulldozer, is projected onto an image sensor using a lens arrangement having a variable position relative to the image sensor arranged along an optical path of the optical system.

In step S302, light in a predetermined wavelength range, for example light in the infrared or near infrared range, is emitted in the direction of the target using a light source. Light in the predetermined wavelength range reflected by the target is guided back in the direction of the optical system.

In step S303, only light in the predetermined wavelength range is selectively guided to the image sensor by switching a first optical filter for selectively allowing light in the predetermined wavelength range to pass through in the direction of the image sensor into the optical path by means of a filter switch.

In step S304, a target is tracked using the reflected light in a sequence of images of the target obtained by the image sensor using a tracking device.

Since the first optical filter can be switched into and out of the optical path, a visual examination of a surrounding region with the target and tracking by means of the tracking device using light in the predetermined wavelength range can be facilitated. With the method for tracking a target a single target can be optically monitored and tracked with light in the predetermined wavelength range, as can a group of different targets tracked in a sequence. For this purpose, the tracking of the group of objects is performed in each case for an object in a predetermined time period, for example, and then in a further time period for a different object. Once all of the objects have been tracked during a time period, the first object can in turn be tracked in a time period.

Figure 4:
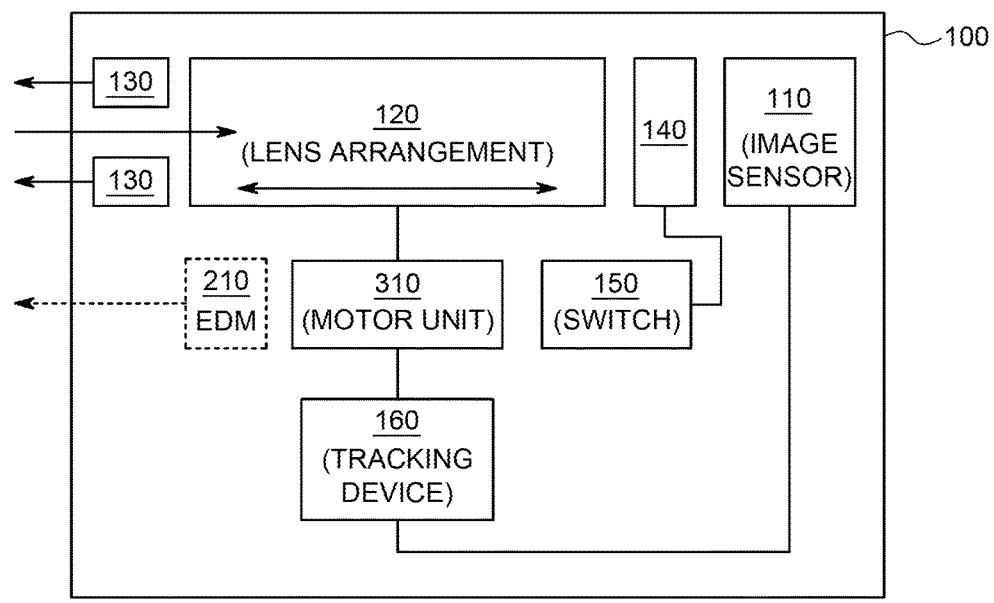
FIG. 4 schematically shows an arrangement of an optical system according to an embodiment example of the present invention.

FIG. 4 shows an embodiment example of an optical system in which particularly the characteristics of the lens arrangement having a changeable position relative to the image sensor are shown.

The optical system according to FIG. 4 corresponds in essential elements to the optical system already shown in FIG. 1. In FIG. 4, a motor unit 310 for moving the lens arrangement relative to the image sensor is additionally shown. The lens arrangement can be moved into a lens position in a wide angle setting and into a lens position in a narrow angle setting. In the wide angle setting, for example, the surrounding region of the optical system depicted on the image sensor is depicted in a wide angle range, so that a large region of the surroundings of the optical system is depicted on the image sensor. The wide angle range is particularly suitable for tracking a target at close range. Furthermore, a smaller angle range of the surroundings of the optical system can be depicted on the image sensor, for example for tracking a target further away. In other words, the narrow angle range therefore corresponds to a zoom setting or telephoto lens setting of the lens arrangement, while the wide angle range corresponds to a wide angle setting.

The motor unit may consist of a single drive unit or of a plurality of drive units, to adjust the positions, preferably the distance, of one or more lenses of the lens arrangement relative to the image sensor. By moving the lenses relative to the image sensor the focal length and the focus of the lens arrangement can be set, for example, to depict objects on the image sensor in sharp focus in the narrow angle setting and in the wide angle setting. The motor unit is preferably provided with a control unit to perform desired lens movements, for example to change the focal length or focus in the case of errors.

Due to the geometric conditions, the image of a target has different characteristics in the wide angle range and in the narrow angle range. In the wide angle setting the change in the position of the image of the target on the image sensor owing to a movement of the target is slower than in the narrow angle setting. Thus, the wide angle setting is particularly suitable for tracking a target at close range, for example when a bulldozer in road construction furnished with the target is in close proximity to the optical system. In order to avoid a significant or quick change in the position of the image of the target on the image sensor, which would make it difficult to track the target by means of updating or tracking the image of the target on the image sensor, the wide angle setting is preferably used with such monitoring of a target at close range or a target at a higher speed. If the object is further away from the optical system, the speed of the change in the position of the image of the target on the image sensor reduces, or, accordingly, when the speed of movement of the target reduces in absolute terms, the lens arrangement can preferably be put in the narrow angle setting in order to use the greater tracking accuracy in this setting.

For this purpose, the motor unit is preferably adapted to put the lens arrangement in the wide angle setting when, for example, an alignment of the optical path for holding the image of the target in the tracking position is not possible owing to the movement of the target or other factors such as the distance of the target to the optical system. Moreover, the motor unit can preferably be provided to put the lens arrangement in the narrow angle setting when an alignment of the optical path for holding the image of the target in the tracking position is possible owing to the movement of the target, for example a reduced speed of movement of the target or a greater distance of the target to the image sensor or accordingly the size of the image.

Thus, the invention advantageously allows a selection to be made between tracking the target using the wide angle setting or optionally using the narrow angle setting. The loss of the target i.e. the movement of the image of the target out of the range of the image sensor, which occurs frequently in the state of the art, can thereby be avoided since when the image of the target can no longer be held in the tracking position or when it is at risk of moving out of the range covered by the image sensor, it is possible to switch to the wide angle setting. In this case, the motor unit 310 can be supplied with a control command in order to carry out a corresponding position change of the lenses of the lens arrangement relative to the image sensor. In addition, a visual examination of the target or targets can be facilitated by the first optical filter being selectively switched into or out of the optical path, such that the wavelengths of the visible light can hit the image sensor. An image of the surrounding region of the optical system obtained in this way can then be seen in an eyepiece or on a display device.

In accordance with the above, the lens arrangement is preferably put in the wide angle setting at the beginning of the tracking in order to reliably detect the target. During the course of the tracking, the wide angle setting can be changed to the narrow angle setting when it is guaranteed, for example, that the image of the target can be held in the tracking position on the image sensor by aligning the optical system. If the image of the target cannot be held in the tracking position by aligning the optical system, and/or if the image of the target on the image sensor moves into or out of the edge region of the image sensor, the narrow angle setting can be changed to the wide angle setting in order to be able to continue to track the target.

It is also preferable if the motor unit 310 can be adapted to perform the movement of the lens arrangement from the lens position in the wide angle range into the lens position in the narrow angle range via a predetermined number of lens positions corresponding to intermediate angle ranges. Intermediate angle ranges can be advantageous when optical properties are very different in the narrow angle range and the wide angle range, such that tracking or a visual examination in the intermediate angle ranges is advantageous.

The number of intermediate angle ranges is preferably selected such that the depth of field ranges of the lens arrangement overlap in adjacent intermediate angle ranges. Thus, when changing the lens arrangement between the individual angle ranges the target can in any case be depicted in sharp focus on the image sensor in order that the optical tracking or examination is not adversely affected. In practical systems, the entire optical range including the narrow angle range and the wide angle range can be covered with five to ten angle ranges.

It is also preferable if the lens position of the lens arrangement in the wide angle range, in the intermediate angle ranges and in the narrow angle range can be selected such that the size of the image of the target on the image sensor is maintained or more or less maintained. The actual size of the image of the target depends on the size of the target and also on the distance of the target from the image sensor and the setting of the lens arrangement relative to the image sensor. The individual angle ranges can now be selected such that in each angle range the distance of the target from the optical system is such that as a result of the distance-related reduction in size of the image of the target on the image sensor in connection with the setting of the lens arrangement in the corresponding angle range, the size of the image of the target on the image sensor is maintained. For a certain measured distance of the target from the optical system, an angle range can therefore advantageously be selected which produces optical properties which hold constant the size of the target on the image sensor.

In a further advantageous embodiment, consideration is given to the fact that the angles measured with the optical system for determining the position of the target contain errors, for example as a result of the axes of the optical system being out of position. As is common with optical systems which perform angle measurements on targets, the measured elevation angles or vertical angles are afflicted with a so-called vertical collimation error, and the measured lateral angles, i.e. horizontal angles, are afflicted with a corresponding lateral collimation error. Measured angles therefore always have to be corrected by the corresponding vertical or lateral collimation error in order to facilitate accurate measurements. The vertical and lateral collimation errors can be determined in advance during manufacture and implementation, including field calibration, i.e. calibration during operation. As is well known in the field, the vertical and lateral collimation errors can be determined by measuring a known target in two telescope positions.

It is apparent that the vertical collimation error and the lateral collimation error are dependent on, inter alia, the position of the lens arrangement relative to the image sensor, and therefore different vertical and lateral collimation errors result for the respective angle ranges. According to the invention, calibration values for predefined positions on the image sensor are therefore advantageously used for a vertical collimation error and a lateral collimation error for lens positions of the lens arrangement in the wide angle range, in the intermediate angle ranges and in the narrow angle range, in order to correct angle values measured when tracking the target. The error corrections applicable to the individual angle ranges, i.e. positions of the lenses of the lens arrangement, can be stored in advance in a memory of the optical system so that when setting the lens arrangement in a certain angle range corresponding correction values for predefined image sensor positions x,y can be read out from the memory and calculated. The correction values can be held for one or more positions on the image sensor for one or more lens positions in the angle ranges.

For example, the angle errors are dependent on the setting angles of the optical systems. For each setting angle, horizontal and vertical, corresponding correction values must therefore be obtained prior to or during operation. In addition, the angle errors may also be dependent on the set focal length and/or the focus. Thus, to determine the required angle correction values for the angles set in the optical system, the valid correction values can be used based on the error values measured in the respective angle positions of the lens arrangement.

In order to respond to changing errors with temperature changes or aging or as a result of other influences, corresponding calibration values can be determined during operation, prior to operation and/or during the manufacture of the optical system for the vertical collimation error and the lateral collimation error for the wide angle range, the intermediate angle ranges and the narrow angle range depending on the angles set in the optical system, horizontal and vertical, and these can be stored in the memory.

If a calibration is performed during operation, the respective lens positions corresponding to the angle ranges are approached by the motor unit, and the measurement errors are determined accordingly, for example by measuring a known target in two telescope positions.

Since the collimation axis errors depend to a great extent on the positions of the lenses and the lens arrangement and therefore on the angle ranges for the measurement, it is desirable that the lens positions corresponding to the angle ranges are held with the highest degree of accuracy. Since it has been established that even positioning errors of motors when setting the positions of the lenses from various initial positions have an influence on the accuracy of the measurement or applicability of the calibration values held for this position, it is preferable if the lens positions of the lens arrangement in the respective angle range, i.e. in the wide angle range, in the intermediate angle ranges and in the narrow angle range, are approached in each case from the same direction relative to the image sensor. This allows positioning errors to be minimized, and the reliability of the measurement results and the applicability of the calibration values held for the respective lens position and angel range to be improved.

The arrangement of the optical system shown in FIG. 4 allows the tracking of a target or a plurality of targets with various angle ranges and lens positions of the lenses of the lens arrangement relative to the image sensor to be performed.

This advantageously makes it possible to track a target in a wide distance range or speed range without avoiding the above-mentioned problems in the state of the art when tracking a target by aligning the optical system or moving the image of the target on the image sensor out of the imaging region.

Moreover, by accordingly switching the first optical filter into and out of the optical path, selectively tracking or visually examining the surroundings of the optical system is possible.

Figure 5:
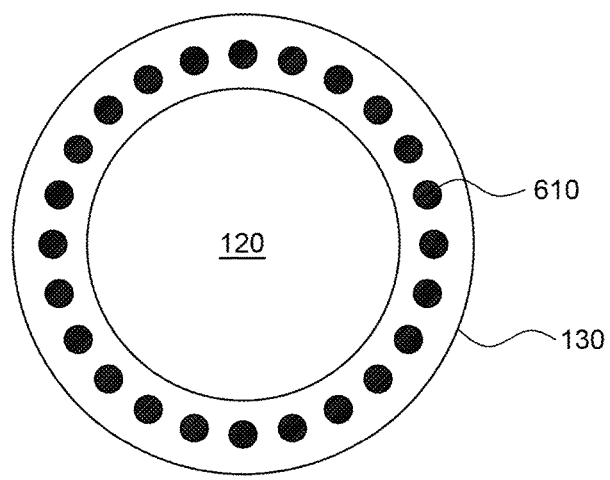
FIG. 5 shows an embodiment example of a light source for emitting light in the direction of a target.

FIG. 5 shows a light source for emitting light in a predetermined wavelength range, for example in the infrared range or the near infrared range, according to an embodiment example of the present invention.

In FIG. 5 the lens arrangement 120 is schematically shown in a top view. The light source 130 is provided in a ring around the lens arrangement 120. Owing to the symmetrical arrangement of the light source 130 around the lens arrangement 120, a corresponding effect of the illumination of the target can be achieved in spite of an eccentric arrangement of individual elements of the light source not on the optical path or in the central region of the lens arrangement. The light source 130 advantageously comprises a plurality of light-emitting diodes 510 which are preferably spaced at equal intervals and arranged in a ring around the lens arrangement 120. The light-emitting diodes emit light in the predetermined wavelength range, for example in the infrared or near infrared range or any other range, which is reflected by the target and enters the lens arrangement 120 and passes through it to hit the image sensor.

The light-emitting diodes 510 may have in one example corresponding beam divergence characteristics such that a homogeneous illumination of the surroundings of the optical system is provided.

Further, the light-emitting diodes 510 may be divided into a first group of light-emitting diodes and a second group of light-emitting diodes such that, for example, every second light-emitting diode in the circumferential direction belongs to the first group and every second light-emitting diode in the circumferential direction is defined as belonging to the second group. The light-emitting diodes of the first group may have narrow beam divergence characteristics and/or a first wavelength range and the second group of light-emitting diodes may have wide beam divergence characteristics and/or a second wavelength range. The narrow beam divergence characteristics are preferably used for the illumination of the target in the narrow angle range, i.e. at a greater distance to the optical system, and the first group of light-emitting diodes with wide beam divergence characteristics is used for the illumination of the surroundings in the wide angle range. The first and second wavelength ranges can preferably be selected such that depending on various ambient conditions such as solar radiation, artificial light, etc. and/or the reflection characteristics of the target or radiation characteristics of the active target, tracking with the light in the different wavelength ranges is facilitated. To this end the diodes can be operated together or selectively.

In accordance with the wavelength ranges, different filters can be provided which are pivoted into the optical path.

A laser light for measuring the distance from an electronic distance meter or EDM can also be used as the light source for illuminating the target.

In a further preferred embodiment, a plurality of groups of light-emitting diodes can be defined, each with beam divergence characteristics which illuminate in an optimum manner an object at the respective distance to the angle range.

The plurality of light-emitting diodes can be pulsed in synchronization with the exposure time of the image sensor 110, such that at the time of an exposure of the image sensor only light in the predetermined wavelength range is emitted and therefore the battery life is extended.

Figure 6:
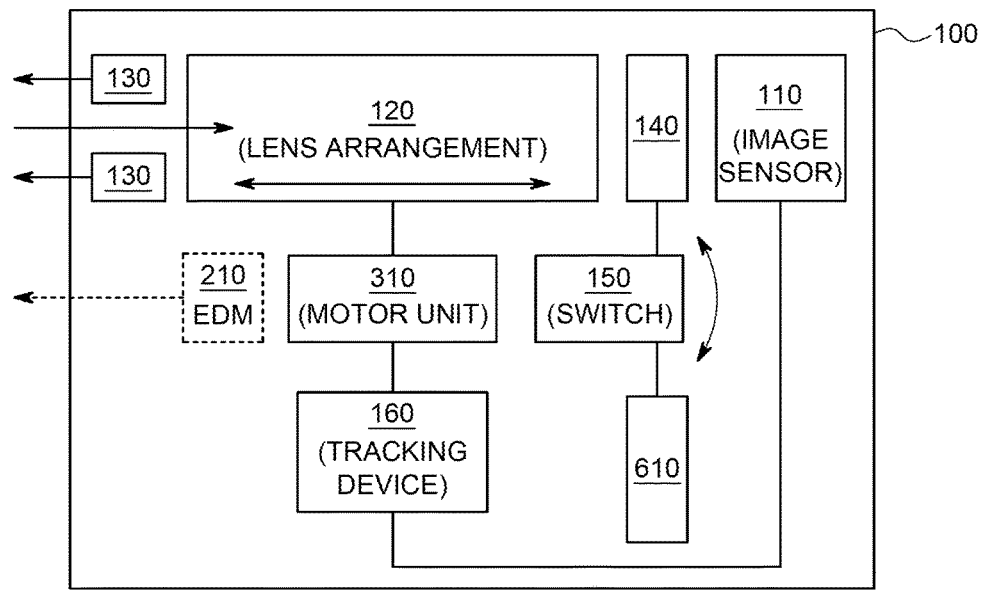
FIG. 6 schematically shows an optical system for tracking a target according to an embodiment example of the present invention.

FIG. 6 shows an optical system according to a further embodiment example of the present invention.

In particular, FIG. 6 illustrates the use of the optical system for tracking and for parallel visual monitoring or examining of the surroundings and the target of the optical system.

As mentioned above, the light-emitting diodes or the light source 130 emit light in the predetermined wavelength range in the direction of the target, which is reflected and guided through the lens arrangement in the direction of the image sensor. To improve the visual representation of the optical system in the visible spectral range, a second optical filter range can be provided for selectively allowing a spectral range suitable for visual imaging to pass through, so that these light wavelengths do not hit the image sensor 110. Furthermore, in one embodiment the filter switch can be adapted to switch the second optical filter into the optical path to make it possible to take a visual image of the target with the image sensor 110. Preferably, when switching the second optical filter 610 the first optical filter 140 will be switched out of the optical path. The switching of the first filter 140 for the second optical filter 610 can be performed by means of the switch 150, or by means of a mechanical switch or a switch with a motor supplied with a corresponding command control.

In a preferred embodiment, the filter switch 150 can be provided by a filter wheel holding the first and second optical filters, and the switching of the first and second optical filters into and out of the optical path is effected by rotating the filter wheel.

In a further, preferred embodiment, the filter wheel can be continuously rotated such that it is possible to alternate between tracking the target and taking the visual image in time with the switching of the filters, i.e. the first and second optical filters, in order to facilitate visual monitoring of the target during the tracking of the object.

FIG. 6 allows the provision of an improved switch between a visual examination and the tracking of one or a plurality of targets by the use of a single optical arrangement in connection with corresponding filters to switch between tracking a target using light in the predetermined wavelength range and a visual examination of a target.

Figure 7:
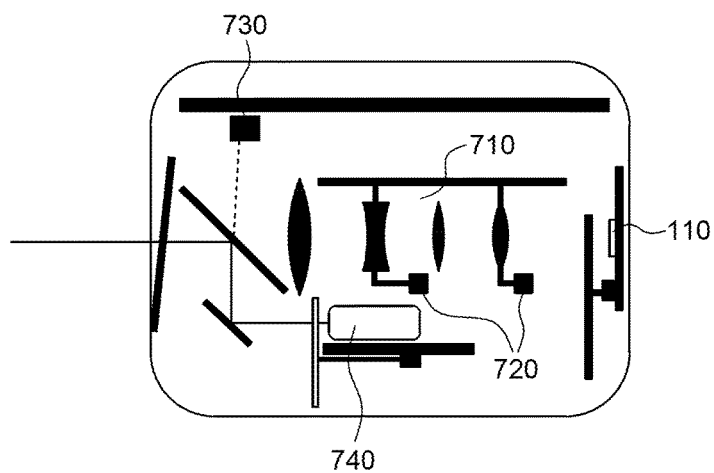
FIG. 7 shows an optical system for tracking a target according to an embodiment example of the present invention.

FIG. 7 shows an arrangement of an optical system according to a further embodiment example of the present invention.

FIG. 7 shows a lens arrangement 710 having a total of four lenses, two of which can be moved relative to the image sensor 110 by motors 720.

As explained above, when tracking a target and determining the position of the target, an accurate angle measurement result is of utmost importance. However, the accuracy of the measurement result is impaired in arrangements with moving lenses and positioning errors of the lenses. In particular, with moving lenses tolerances can lead to the fact that in spite of the same desired position of a lens, for example with consecutive measurements of a target having the same angle position, the accuracy of the measurement is greatly impaired as a result of positioning errors in the actual control of a position.

In particular, tolerances in the case of actuators, suspensions, etc. can lead to the same position setting of a lens resulting in different actual positions since the positioning errors can have a random nature.

In order to perform an accurate measurement of an angle to a target, however, an accurate positioning of the lenses or knowledge of the positioning errors is required.

As mentioned above, accurate tracking of a target requires the tracking position or the accuracy of the tracking position as the position in which an electronic distance meter measures a distance to an object. The determination of the tracking position with the distance meter can be performed as described above. However, during operation the tracking positions cannot be determined or corrected without interfering with the operation.

Thus, a monitor diode 730 can be provided in a further embodiment example, which emits light along the optical path as monitor light in the direction of the image sensor 110. The monitor diode in the example in FIG. 7 provides monitor light via a beam splitter, such as a half-mirror or a mirror with a different light distribution ratio, in the direction of the image sensor. The random changes in the lens position in spite of the same position setting, as described above, in particular in the lateral direction, result in a shift of the point of impact of the light from the monitor diode on the image sensor. A difference in the point of impact of the light from the monitor diode from a point of impact with an ideal lens position allows a conclusion to be drawn as to the magnitude of the position error of the lenses and allows a corresponding correction of the tracking position. In other words, the tracking point on the image sensor can be corrected based on the distance of the actual position of the monitor light on the image sensor to a desired position of the monitor light on the image sensor, for example with error-free lens positioning. If, for example, the point of impact of the monitor light is moved in each case by 1 pixel in the frontal direction of the image sensor and the vertical direction of the image sensor, for example in FIG. 2, the tracking position can be moved accordingly by 1 pixel in the X-direction and 1 pixel in the Y-direction on the image sensor and taken as a basis for the tracking of the target.

As an alternative to a monitor diode, a reflector may be provided, which reflects a part of the laser light emitted by an electronic distance meter 740 by means of a beam splitter such as a half mirror or a mirror with a different light distribution ratio and directs it in the direction of the image sensor. In accordance with the light from the monitor diode 730, the position of the point of impact of the laser light on the image sensor will change with random lateral movements of the lenses, such that as in the case of the monitor diode the tracking position can be corrected.

Accordingly, a correction unit can additionally be provided to detect a displacement in the position of the monitor light or of the reflected light from the laser for distance measurement on the image sensor 110 owing to a lateral movement of the lenses in the lens arrangement 120 and the tracking position can be corrected accordingly using this displacement. With the arrangement shown in FIG. 7, the accuracy of tracking an object can be improved in spite of a lens arrangement having changing lens positions, since positioning errors of the lenses can be taken into account.

The invention claimed is:

1. An optical system for visually imaging and/or tracking a target, comprising:
    an image sensor;
    a lens arrangement having a variable position relative to the image sensor along an optical path of the optical system to project an image of the target onto the image sensor;
    a motor unit adapted to move lenses of the lens arrangement to approach lens positions of the lens arrangement from a same direction relative to the image sensor to minimize positioning errors;
    a light source for emitting light in a predetermined wavelength range in the direction of the target;
    a first optical filter for selectively allowing the light in the predetermined wavelength range to pass through in the direction of the image sensor;
    a filter switch for switching the first optical filter into and out of the optical path;
    a beam splitter configured to direct at least a portion of light from a laser used for distance measurement or from a monitor diode along the optical path as monitor light in the direction of the image sensor; and
    a tracking device for:
        tracking the target using the reflected light in the predetermined wavelength range in a sequence of images of the target obtained by the image sensor when the first optical filter is switched into the optical path;
        detecting a displacement of a position of the monitor light on the image sensor owing to lateral movement of lenses of the lens arrangement, and
        correcting a tracking position of the target using the displacement of the position of the monitor light.

2. The optical system according to claim 1, wherein the tracking device is adapted to perform the tracking of the target by determining the position of the image of the target on the image sensor and aligning the optical path of the optical system such that the position of the image of the target on the image sensor comes to rest in and is held in a predetermined tracking position; and
    the tracking device is adapted to additionally perform the tracking of the target if an alignment of the optical path for holding the image of the target in a tracking position is not possible owing to the movement of the target, by tracking the changing position of the image of the target on the image sensor.

3. The optical system according to claim 1, comprising a laser device for emitting laser light along the optical path in the direction of the target, and wherein a tracking position is specified as the position of the laser light reflected by the target on the image sensor, which is emitted for measuring a distance from the optical system.

4. The optical system according to claim 3, wherein the laser light is detected by the image sensor using an optical band-pass filter.

5. The optical system according to claim 1, comprising a motor unit for moving the lens arrangement relative to the image sensor into a lens position in a wide angle setting and into a lens position in a narrow angle setting and to put the lens arrangement in the wide angle setting if an alignment of the optical path for holding the image of the target in the tracking position is not possible and to put the lens arrangement in the narrow angle setting if an alignment of the optical path for holding the image of the target in the tracking position is possible.

6. The optical system according to claim 5, wherein the motor unit is adapted to move the lens arrangement from the position in the wide angle setting into the position in the narrow angle setting during the tracking of the target.

7. The optical system according to claim 5, wherein the motor unit is adapted to perform the movement of the lens arrangement from the lens position in the wide angle range into the lens position in the narrow angle range via a predetermined number of lens positions corresponding to intermediate angle ranges.

8. The optical system according to claim 7, wherein the predetermined number of intermediate angle ranges is selected such that the depth of field ranges of the lens arrangement overlaps corresponding lens positions in adjacent intermediate angle ranges.

9. The optical system according to claim 7, wherein the lens position of the lens arrangement in the wide angle range, in the intermediate angle ranges and in the narrow angle range is selected such that the size of the image of the target on the image sensor is maintained.

10. The optical system according to claim 1, wherein the light source is provided by a plurality of light-emitting diodes arranged around the lens arrangement.

11. The optical system according to claim 10, wherein the plurality of light-emitting diodes includes a first group of light-emitting diodes having narrow beam divergence characteristics and a second group of light-emitting diodes having wide beam divergence characteristics.

12. The optical system according to claim 1, wherein the light source is pulsed in synchronization with an exposure time of the image sensor.

13. The optical system according to claim 1, comprising a second optical filter for selectively allowing a spectral range suitable for visual imaging to pass through; and wherein the filter switch is adapted to switch the second optical filter into the optical path to take a visual image of the target with the image sensor.

14. The optical system according to claim 13, wherein the filter switch is provided by a filter wheel holding the first and second optical filters and wherein the switching of the first and second optical filters into and out of the optical path is effected by rotating the filter wheel, wherein the filter wheel is continuously rotated to alternate between tracking the target and taking the visual image in time with the switching of the filters, to facilitate visual monitoring of the target during the tracking of the object.

15. The optical system according to claim 1, comprising a monitor diode, which emits light along the optical path as monitor light in the direction of the image sensor.

16. The optical system according to claim 1, wherein the optical system is part of a total station.

17. An optical system for visually imaging and/or tracking a target, comprising:
    an image sensor:
    a lens arrangement having a variable position relative to the image sensor along an optical path of the optical system to project an image of the target onto the image sensor;
    a light source for emitting light in a predetermined wavelength range in the direction of the target;
    a first optical filter for selectively allowing the light in the predetermined wavelength range to pass through in the direction of the image sensor;
    a filter switch for switching the first optical filter into and out of the optical path;
    a tracking device for tracking the target using the reflected light in the predetermined wavelength range in a sequence of images of the target obtained by the image sensor when the first optical filter is switched into the optical path;
    a motor unit for moving the lens arrangement relative to the image sensor into a lens position in a wide angle setting and into a lens position in a narrow angle setting and to put the lens arrangement in the wide angle setting if an alignment of the optical path for holding the image of the target in the tracking position is not possible and to put the lens arrangement in the narrow angle setting if an alignment of the optical path for holding the image of the target in the tracking position is possible, wherein:
    the motor unit is adapted to perform the movement of the lens arrangement from the lens position in the wide angle range into the lens position in the narrow angle range via a predetermined number of lens positions corresponding to intermediate angle ranges; and
    lens positions of the lens arrangement in the wide angle range, in the intermediate angle ranges, and in the narrow angle range, calibration values for predefined image sensor positions are used for a vertical collimation error and a lateral collimation error to correct measured angle values when tracking the target, wherein the calibration values are determined at the respective lens positions by measuring an object in two telescope positions.

18. The optical system according to claim 17, wherein the motor unit is adapted to move lenses of the lens arrangement to approach respective lens positions of the lens arrangement in the wide angle range, in the intermediate angle ranges, and in the narrow angle range from the same direction relative to the image sensor to minimize positioning errors.

19. A method for visually imaging and/or tracking a target, comprising:
    projecting an image of the target onto an image sensor using a lens arrangement having a variable position relative to the image sensor arranged along an optical path of the optical system;
    emitting light in a predetermined wavelength range in the direction of the target using a light source, wherein the light source comprises a plurality of light-emitting diodes, and the plurality of light-emitting diodes includes a first group of light-emitting diodes having narrow beam divergence characteristics and a second group of light-emitting diodes having wide beam divergence characteristics;
    selectively allowing the light in the predetermined wavelength range to pass through by means of a first optical filter;
    switching the first optical filter into and out of the optical path by means of a filter switch;
    switching the first optical filter into the optical path; and
    tracking the target using the reflected light in the predetermined wavelength range in a sequence of images of the target obtained by the image sensor using a tracking device.

* * * * *